(12) United States Patent
Yoon et al.

(10) Patent No.: US 10,986,393 B2
(45) Date of Patent: Apr. 20, 2021

(54) DISPLAY APPARATUS, METHOD FOR UI DISPLAY THEREOF AND COMPUTER-READABLE RECORDING MEDIUM

(71) Applicant: SAMSUNG ELECTRONICS CO., LTD., Suwon-si (KR)

(72) Inventors: Yeo-ri Yoon, Cheongju-si (KR); Dae-hyun Kim, Busan (KR); Han-soo Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/432,476

(22) Filed: Jun. 5, 2019

(65) Prior Publication Data
US 2019/0289245 A1 Sep. 19, 2019

Related U.S. Application Data

(63) Continuation of application No. 14/149,217, filed on Jan. 7, 2014, now abandoned.

(30) Foreign Application Priority Data

Jan. 7, 2013 (KR) ........................ 10-2013-0001800

(51) Int. Cl.
*H04N 5/44* (2011.01)
*H04N 21/422* (2011.01)
*G06F 3/02* (2006.01)

(52) U.S. Cl.
CPC ..... *H04N 21/42204* (2013.01); *G06F 3/0227* (2013.01); *H04N 21/42214* (2013.01); *H04N 21/42218* (2013.01)

(58) Field of Classification Search
CPC ................ G06F 3/0227; H04N 5/4403; H04N 21/42214; H04N 21/42218
See application file for complete search history.

(56) References Cited

U.S. PATENT DOCUMENTS 8,505,049 B2   8/2013   Ellis et al.
9,071,879 B2   6/2015   Ellis et al.
(Continued)

FOREIGN PATENT DOCUMENTS

CN   1371571 A   9/2002
CN   1545008 A   11/2004
JP   2010-118720 A   5/2010

OTHER PUBLICATIONS

Communication dated Oct. 18, 2019, issued by the European Patent Office in counterpart European Application No. 14 735 363.5.
(Continued)

*Primary Examiner* — Seth A Silverman
(74) *Attorney, Agent, or Firm* — Sughrue Mion, PLLC

(57) ABSTRACT

A display apparatus is provided. The display apparatus includes a display configured to display a user interface window for receiving a letter input; a communication interface configured to receive a control instruction for inputting letters from a control device; and a controller configured to control the display to selectively display an on-screen keypad for inputting letters on the user interface window based on whether the control device includes letter keys for inputting letters.

16 Claims, 8 Drawing Sheets

(56) References Cited

U.S. PATENT DOCUMENTS

| | | | |
|---|---|---|---|
| 2004/0078792 A1* | 4/2004 | Chew ................. | G06F 3/04886 717/168 |
| 2004/0117831 A1 | 6/2004 | Ellis et al. | |
| 2007/0266418 A1 | 11/2007 | Lin | |
| 2009/0007001 A1* | 1/2009 | Morin ................... | G06F 3/0237 715/773 |
| 2009/0019485 A1 | 1/2009 | Ellis et al. | |
| 2009/0231281 A1 | 9/2009 | Whytock et al. | |
| 2010/0115559 A1 | 5/2010 | Ellis | |
| 2010/0164897 A1 | 7/2010 | Morin et al. | |
| 2010/0192179 A1 | 7/2010 | Ellis et al. | |
| 2011/0128228 A1 | 6/2011 | Van der Byl | |
| 2011/0175826 A1 | 7/2011 | Moore et al. | |
| 2011/0276916 A1 | 11/2011 | Kunori | |
| 2012/0011460 A1 | 1/2012 | Cheng | |
| 2012/0030607 A1 | 2/2012 | Michel et al. | |
| 2012/0084663 A1 | 4/2012 | Momchilov et al. | |
| 2012/0092563 A1 | 4/2012 | Kwon et al. | |
| 2012/0229320 A1* | 9/2012 | Yu ..................... | H04N 21/42218 341/176 |
| 2013/0215005 A1* | 8/2013 | Senanayake ............ | G06F 3/016 345/156 |
| 2014/0040942 A1 | 2/2014 | Ellis et al. | |
| 2015/0312640 A1 | 10/2015 | Ellis et al. | |

OTHER PUBLICATIONS

International Search Report and Written Opinion dated Apr. 24, 2014 issued by the International Searching Authority in counterpart International Application No. PCT/KR2014/000087 (PCT/ISA/210 & PCT/ISA/237).

Communication dated Aug. 8, 2016 issued by the European Patent Office in counterpart European Application No. 14735363.5.

Communication dated Oct. 11, 2016 issued by the Korean Intellectual Property Office in counterpart Korean Application No. 10-2013-0001800.

Communication dated Dec. 14, 2017, issued by the State Intellectual Property Office of the People's republic of China in counterpart Chinese Patent Application No. 201480003343.1.

Communication dated May 3, 2018, from the State Intellectual Property Office of People's Republic of China in counterpart Application No. 201480003343.1.

Communication dated May 2, 2017, from the State Intellectual Property Office of People's Republic of China in counterpart Application No. 201480003343.1.

Communication dated Jan. 7, 2019 issued by the State Intellectual Property Office of P.R. China in counterpart Chinese Application No. 201480003343.1.

Office Action issued in parent U.S. Appl. No. 14/149,217 dated Nov. 4, 2015.

Final Office Action issued in parent U.S. Appl. No. 14/149,217 dated Jun. 8, 2016.

Office Action issued in parent U.S. Appl. No. 14/149,217 dated Nov. 17, 2016.

Final Office Action issued in parent U.S. Appl. No. 14/149,217 dated Mar. 28, 2017.

Office Action issued in parent U.S. Appl. No. 14/149,217 dated Dec. 13, 2017.

Final Office Action issued in parent U.S. Appl. No. 14/149,217 dated May 16, 2018.

Office Action issued in parent U.S. Appl. No. 14/149,217 dated Sep. 11, 2018.

Final Office Action issued in parent U.S. Appl. No. 14/149,217 dated Feb. 5, 2019.

Communication dated Nov. 25, 2020, issued by the State Intellectual Property Office of P.R. China in Chinese Application No. 201810788908.1.

* cited by examiner

FIG. 6
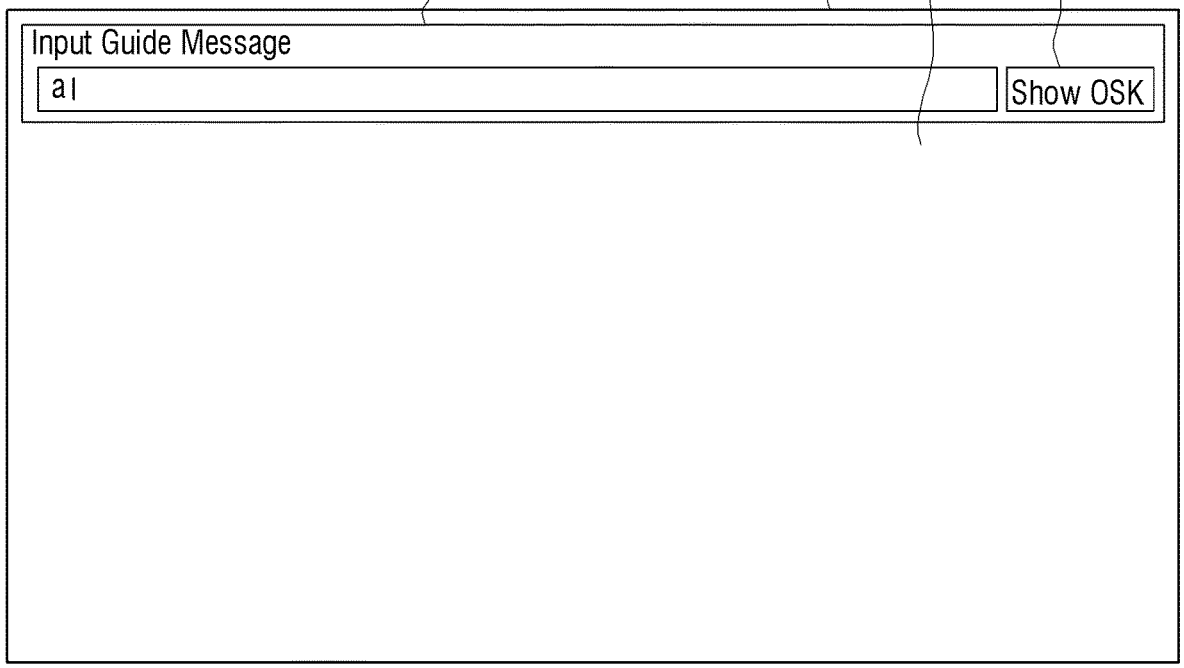
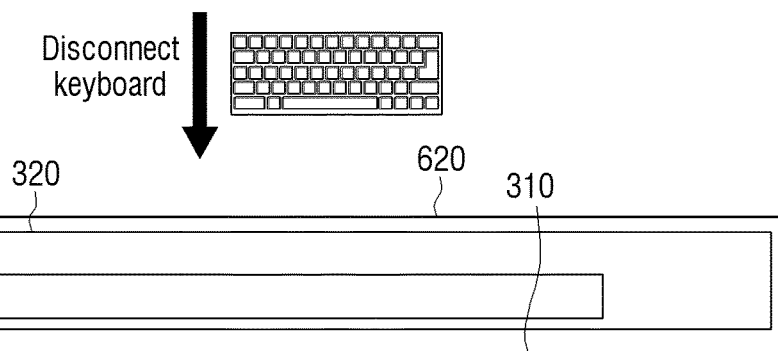
Disconnect keyboard
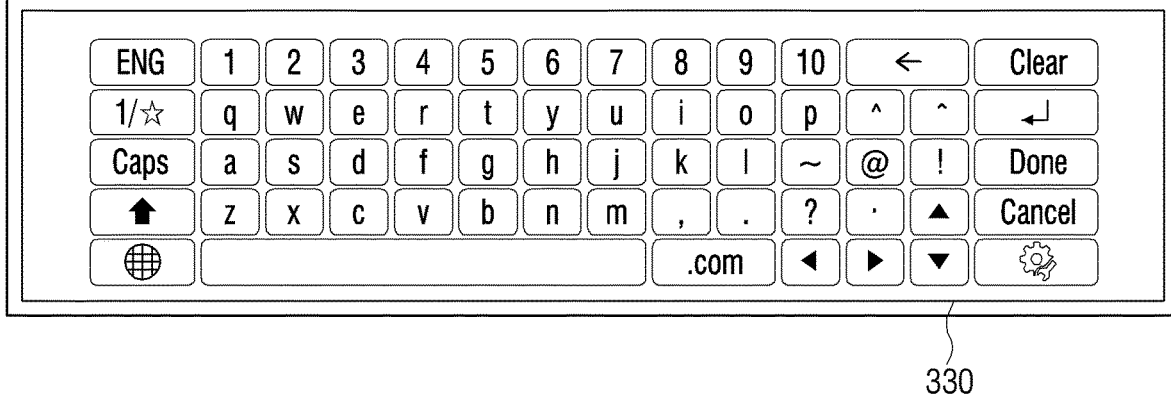

FIG. 7
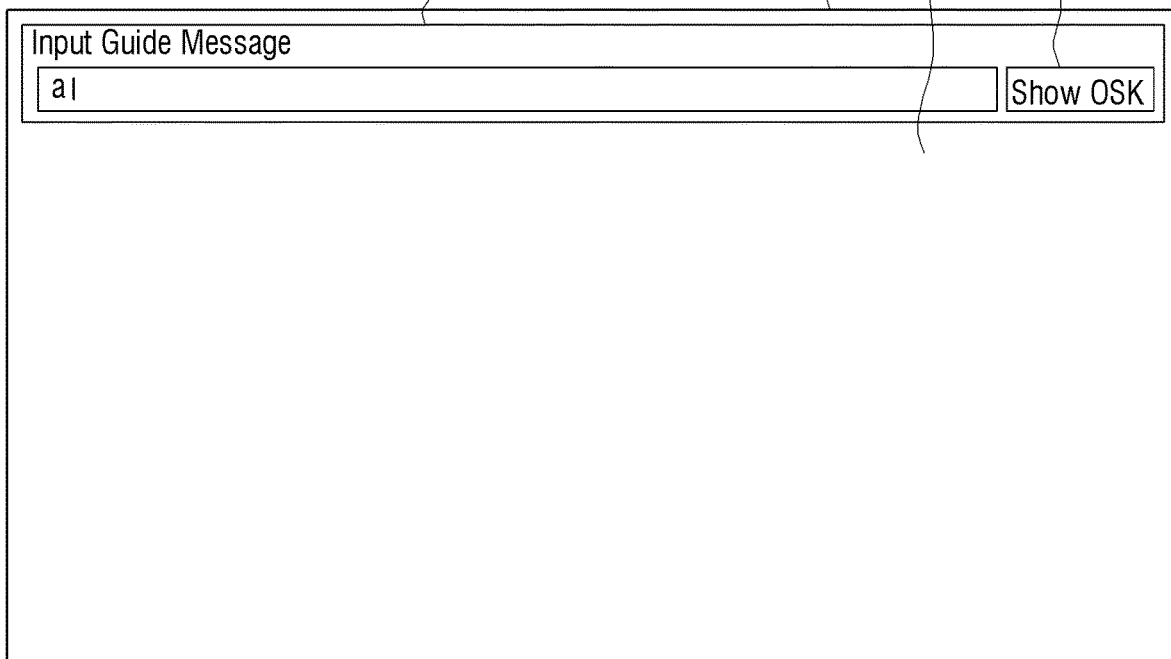
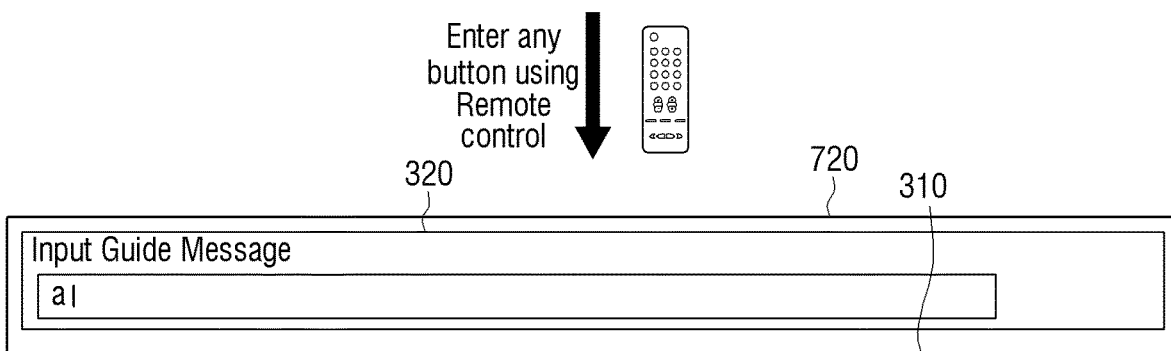
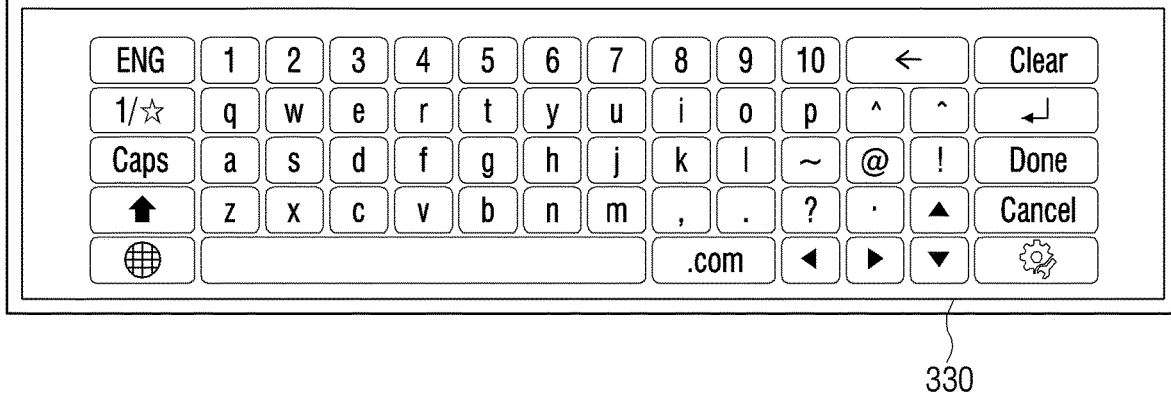

DISPLAY APPARATUS, METHOD FOR UI DISPLAY THEREOF AND COMPUTER-READABLE RECORDING MEDIUM

CROSS-REFERENCE TO RELATED APPLICATIONS

This is a continuation of U.S. application Ser. No. 14/149,217 filed Jan. 7, 2014, and claims priority from Korean Patent Application No. 10-2013-0001800, filed on Jan. 7, 2013, in the Korean Intellectual Property Office, the contents of which are incorporated herein by reference in their entirety.

BACKGROUND

1. Field

Apparatus and methods consistent with exemplary embodiments relate to a display apparatus, a method for (User Interface) UI display thereof and a computer-readable recording medium, and more particularly, to a display apparatus that can display on-screen keypad variably depending on whether a control device connected to the display apparatus includes letter keys for inputting letters, a method for UI display thereof and a computer-readable recording medium.

2. Description of the Related Art

A display apparatus displays an image signal received from an external source. Recently, among other functions, display apparatuses support Internet surfing and often receive letter inputs from users.

In the related art, display apparatuses receive letter inputs via devices without physical letter keys for inputting letters, such as a remote controller, and thus display apparatuses display an on-screen keypad to receive letter inputs from users selecting the letters to be input using left/right and up/down buttons on the remote controller.

Recently, display apparatuses may be connected to various control devices and can receive letter inputs via a wireless keyboard, which includes letter keys for inputting letters.

Even in the case that the letters are input via a wireless keyboard, related art display apparatuses display the same user interface window as displayed while using a remote controller.

While inputting letters via a keyboard including letter keys, it is only necessary to confirm that the letters being pressed on the keyboard are correctly reflected on the screen. However, related art display apparatuses always display an on-screen keypad regardless of the input means, thus increasing complexity of the screen and causing confusion to users.

SUMMARY

Exemplary embodiments provide a display apparatus that can display an on-screen keypad variably depending on whether a control device connected to the display apparatus includes letter keys for inputting letters, a method for UI display thereof and a computer-readable recording medium.

According to an aspect of an exemplary embodiment, there is provided a display apparatus including: a display configured to display a user interface window for receiving a letter input; a communication interface configured to receive a control instruction for inputting letters from the control device; and a controller configured to control the display to selectively display an on-screen keypad for inputting letters on the user interface window based on whether the control device includes letter keys for inputting letters.

The controller may control the display so that the user interface window comprises a first region displaying letters corresponding to the control instruction, and a second region displaying the on-screen keypad for inputting letters, when the control device does not include letter keys for inputting letter, and may control the display so that the user interface window does not comprise the second region when the control device includes letter keys for inputting letters.

The display apparatus may further include a determination unit configured to determine whether the control device includes letter keys for inputting letters.

The determination unit may determine whether the control device includes letter keys for inputting letters when it is necessary to display a user interface window for receiving the letter input.

The determination unit may determine whether the control device includes letter keys for inputting letters upon receipt of a control instruction for inputting letters from the control device.

The determination unit may determine that the control device includes letter keys for inputting letters when the control device comprises a QWERTY keyboard.

The display apparatus may further include an image processor configured to process an image, and the display may display the processed image and the user interface window together.

The user interface window further includes a third region for selecting whether an on-screen keypad is displayed, and the controller may control the display to display the on-screen keypad even though the control device includes letter keys for inputting letters, upon receipt of an instruction for displaying the on-screen keypad by selection of the third region.

The on-screen keypad may have a QWERTY keyboard form.

The controller may control the display so that the user interface window further comprises a third region for selecting whether an on-screen keypad is displayed, when the control device includes letter keys for inputting letters.

According to an aspect of another exemplary embodiment, there is provided a method for displaying UI of a display apparatus configured to be connected to a control device, the method including: receiving a control instruction for inputting letters from the control device; determining whether the control device includes letter keys for inputting letters; and selectively displaying an on-screen keypad for inputting letters depending on whether the control device includes letter keys for inputting letters.

The selectively displaying may include displaying a user interface window comprising a first region displaying letters corresponding to the control instruction and a second region displaying the on-screen keypad for inputting letters when the control device does not include letter keys for inputting letters, and displaying the user interface window which does not comprise the second region when the control device includes letter keys for inputting letters.

The determining may include determining whether the control device includes letter keys for inputting letters when it is necessary to display a user interface window for receiving a user input.

The determining may include determining whether the control device includes letter keys for inputting letters upon receipt of a control instruction for inputting letters from the control device.

The determining may include determining that the control device includes letter keys for inputting letters when the control device comprises a QWERTY keyboard.

The method may further include processing an image, and the displaying may display the processed image and the user interface window together.

The selectively displaying may include displaying a user interface window, which does not comprise a second region displaying the on-screen keypad for inputting letters and comprises a third region for selecting whether the on-screen keypad is displayed when the control device includes letter keys for inputting letters, and displaying the on-screen keypad even though the control device includes letter keys for inputting letters, upon receipt of an instruction for displaying the on-screen keypad by selection of the third region.

The on-screen keypad may have a QWERTY keyboard form.

The selectively displaying may include displaying the user interface window which further comprises a third region for selecting whether an on-screen keypad is displayed, when the control device includes letter keys for inputting letters.

According to an aspect of another exemplary embodiment, there is provided a non-transitory computer-readable recording medium comprising a program for executing a method for displaying UI. The method may include: receiving a control instruction for inputting letters from a control device; determining whether the control device includes letter keys for inputting letters; and selectively displaying an on-screen keypad for inputting letters depending on whether the control device includes letter keys for inputting letters.

BRIEF DESCRIPTION OF THE DRAWINGS

The above and/or other aspects will become apparent and more readily appreciated from the following description of exemplary embodiments, taken in conjunction with the accompanying drawings of which:

FIGS. 5-7 are views for explaining operation of a display apparatus based on the operation of a control device.

DETAILED DESCRIPTION OF EXEMPLARY EMBODIMENTS

Figure 1:
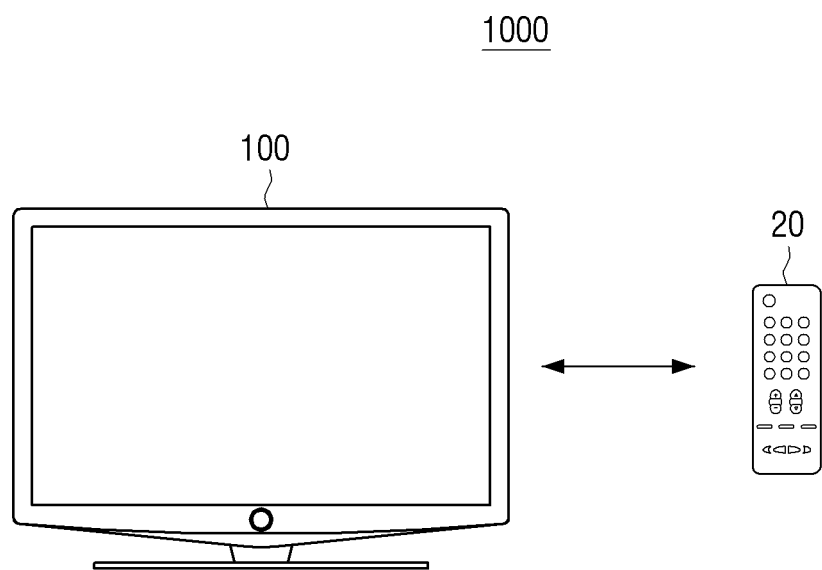
FIG. 1 is a block diagram of a display system according to an exemplary embodiment.

Reference will now be made in detail to embodiments of the present general inventive concept, examples of which are illustrated in the accompanying drawings, wherein like reference numerals refer to the like elements throughout. The exemplary embodiments are described below in order to explain the present general inventive concept by referring to the figures.

FIG. 1 is a block diagram of a display system according to an exemplary embodiment.

Referring to FIG. 1, a display system 1000 includes a display apparatus 100 and a control device 20.

The display apparatus 100 provides an image or image/audio information to a user. The display apparatus 100 may be a monitor or a digital TV. In detail, the display apparatus 100 displays a user interface window for receiving a letter input when letter input is required. The display apparatus 100 displays an on-screen keypad depending on whether the connected control device 20 includes letter keys for inputting letters. Herein, the letter keys may be physical buttons or keys displayed on a touch panel display. The detailed configuration and operation of the display apparatus 100 will be explained later with reference to FIG. 2.

The control device 20 includes buttons (in detail, physical buttons or UI buttons) for receiving a display control instruction and provides the input control instruction wirelessly or via a wire to the display apparatus 100. The control device 20 may be a common remote controller, which does not include letter keys for inputting letters, or a wireless keyboard, a smart phone, an MP3 player or a PMP, which include letter keys for inputting letters.

As explained above, the display system 1000, according to an exemplary embodiment, selectively displays an on-screen keypad depending on whether the control device includes letter keys for inputting letters. Thus, when a control device without including letter keys for inputting letters is used, letters can be input easily, and when a control device including letter keys for inputting letters is used, it is possible to prevent the inconvenience of covering the screen with anon-screen keypad.

The display apparatus 100 and the control device 20 have been explained above as being directly connected to each other, but the display apparatus 100 and the control device 20 may be connected via an intermediate device such as a router. Although the display apparatus 100 is shown as being connected to one control device 20, the display apparatus 100 may be connected to a plurality of control devices 20.

Figure 2:
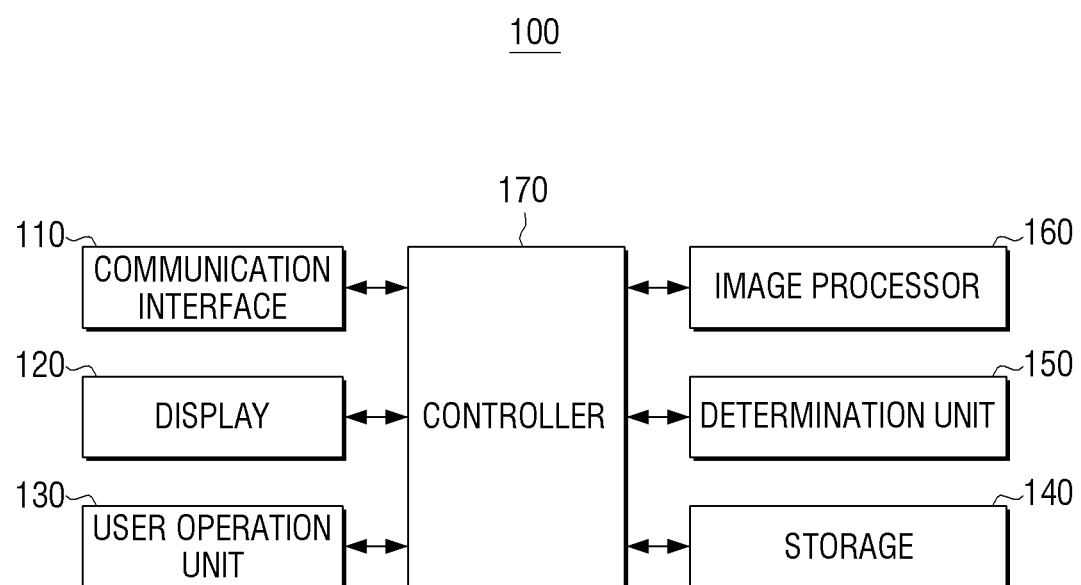
FIG. 2 is a view for showing the detailed configuration of the display apparatus of FIG. 1, according to an exemplary embodiment.

FIG. 2 is a view for showing the detailed configuration of the display apparatus of FIG. 1, according to an exemplary embodiment.

Referring to FIG. 2, the display apparatus 100 includes a communication interface 110, a display 120, a user operation unit 130, a storage 140, a determination unit 150, an image processor 160 and a controller 170.

The communication interface 110 is configured to connect the display apparatus 100 to the external device (not shown), and may be connected to the external device via wireless communication (e.g., Wi-Fi, Bluetooth, GSM, UMTS, LTE and WiBRO), a wired connection (USB, PS/2), a local area network (LAN) or an Internet network.

The communication interface 110 may perform a communication with the control device 20. In detail, the communication interface 110 may receive information about the control device (e.g., device name, model name and whether it includes letter keys for inputting letters) from the control device 20 and may receive a control instruction from the control device.

The communication interface 110 may receive an image signal. In detail, the communication interface 110 may receive an image signal from an external image providing apparatus (e.g., set top box). The image signal may be a broadcast signal transmitted via a wired connection or wirelessly from a broadcasting station or a satellite, an image content transmitted via an HDMI cable and an AV terminal from a DVD player or a Blu-Ray player, or an image content transmitted via a USB from a mobile phone or a computer.

The communication interface 110 may receive a data signal. In detail, the communication interface 110 may receive data signals such as Internet webpages or Internet moving images from the Internet network.

The display 120 may display information provided from the display apparatus 100. The display 120 may be an image display apparatus such as an LCD, a PDP or a CRT.

The display 120 may display an image. In detail, the display 120 may display an image produced by an image processor 160, which will be explained in more detail below.

The display 120 displays a user interface window for receiving letter input. In detail, the display 120 displays a user interface window for inputting letters when it is necessary to input letters on the display apparatus 100, for example, when user control instructions are required, such as during an Internet search or a contents search. The display 120 may display the user interface window and the image produced by the image processor 160 together, if the display is displaying an image. At this time, the image displayed, together with the user interface window, may be a webpage image, a moving image or a TV image.

The user interface window may be displayed variably, depending on the type of control device inputting the control instruction. In detail, when the control device inputting the control instruction does not include letter keys for inputting letters, the display 120 may display a first user interface window including a first region and a second region, wherein the first region displays letters corresponding to the control instruction input and the second region displays an on-screen keypad for inputting letters.

On the contrary, when the control device inputting the control instruction letter keys for inputting letters, the display 120 may display a second user interface window, which does not include the second region from the first user interface window. The second user interface window may include a third region for selecting whether the on-screen keypad is displayed. The detailed examples of the user interface window will be explained later with regard to FIGS. 3 and 4.

The user operation unit 130 may receive a user control instruction. In detail, the user operation unit 130 may include a plurality of function keys that a user can manipulate to perform or select various functions supported by the display apparatus 100. In the present embodiment, the display 120 and the user interface 130 have been explained as separate constitutional elements, but they may be implemented as one device, such as a touch screen in which an input and an output are realized simultaneously.

The storage 140 may store contents corresponding to various services supported by the display apparatus 100. The storage 140 may store a program for driving the display apparatus 100. In detail, the storage 140 may store a program which is a set of various instructions needed to drive the display apparatus 100. The program may include operating programs for driving applications as well as applications for providing certain services.

The storage 140 may store information on the control device including letter keys for inputting letters. The information on the control device may be a model name or device name of the control device including letter keys for inputting letters. In the current embodiment, the storage 140 stores information about the control device including letter keys for inputting letters, but the storage 140 may also store information about a control device without including letter keys for inputting letters. The storage 140 may also store information as to whether all control devices include letter keys for inputting letters. Such information may be provided by the manufacturer or produced by user's setting.

The storage 140 may be implemented as a memory within the display apparatus 100 or as an external storage, such as a removable disk including a USB memory, a storage connected to a separate host or a web server via the network.

The determination unit 150 determine whether the control device includes letter keys for inputting letters. In detail, the determination unit 150 may determine whether the control device, which currently inputs the control instruction, includes letter keys for inputting letters, such as a QWERTY keyboard, based on information about the control device received via the communication interface 110 and information about the control device stored in the storage 140. In the current embodiment, the QWERTY keyboard is exemplified for inputting letters, but keyboards with other layouts such as Korean keyboard type 2, Korean keyboard type 3, Dvorak keyboard, etc. may be used.

The above determination may be performed when it is necessary to display a user interface window for receiving a letter input, when a control instruction for inputting letters is input, or in real time (per a predetermined time period).

The image processor 160 processes an image. In detail, the image processor 160 may perform an image processing for an image signal or a data signal received via the communication interface 110 and provide the processed image signal to the display 120.

The controller 170 controls each of the constitutional elements within the display apparatus 100. In detail, the controller 170 may determine whether it is necessary to display a user interface window for inputting letters upon receipt of a control instruction from the control device 20, and controls the determination unit 150 to determine whether the control device inputting the control instruction includes letter keys for inputting letters when it is necessary to display a user interface window for inputting letters.

As a result of the determination, when the control device inputting the control instruction does not include letter keys for inputting letters, the controller 170 may control the display 120 to display a first user interface window including a first region displaying letters corresponding to the control instruction and a second region displaying an on-screen keypad for inputting letters.

On the contrary, when the control device inputting the control instruction includes letter keys for inputting letters, the controller 170 may control the display 120 to display a second user interface window, which does not include the second region from the first user interface window. The controller 170 may control the display 120 to display the second user interface window including a third region for selecting whether the on-screen keypad is displayed.

When a user selects the third region on the second user interface window, the controller 170 may control the display 120 to display the first user interface window including the on-screen keypad even though the control device includes letter keys for inputting letters.

The controller 170 may control the display 120 to display letters corresponding to the received control instruction for inputting letters upon receipt of a control instruction for inputting letters via the communication interface 110.

As explained above, the display apparatus 100, according to an exemplary embodiment, selectively displays an on-screen keypad depending on whether the control device includes letter keys for inputting letters, and thus when a control device without letter keys for inputting letters is used, letters can be easily input using the on-screen keypad, and when a control device with letter keys for inputting letters is used, it is possible to prevent the inconvenience of covering the screen with an on-screen keypad.

In the explanation of FIG. 2 above, the display 120, the first image processor 160 and the controller 170 have been described as separate elements, but the determination unit 150 and the controller 170 may be one element, and the determination unit 150, the image processor 160 and the controller 170 may be implemented as one element.

Figure 3:
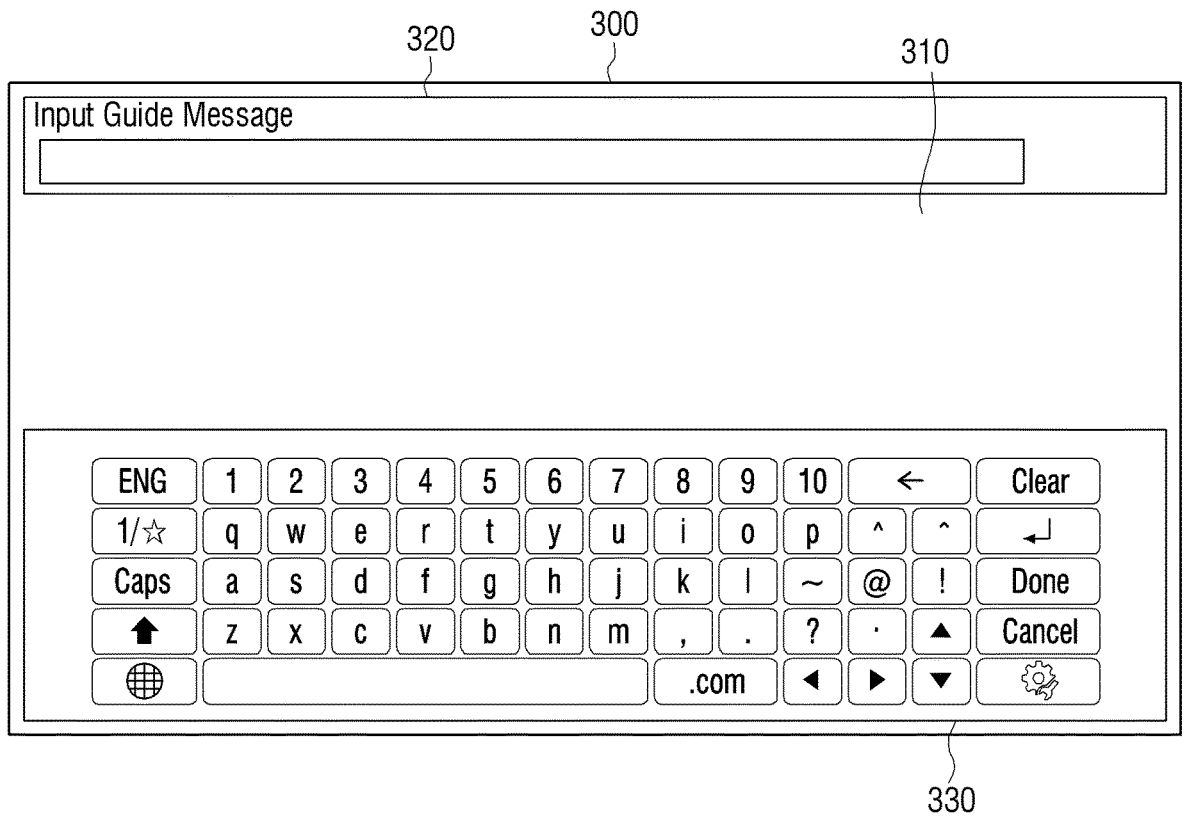
FIGS. 3 and 4 are views for showing examples of user interface windows that can be displayed on the display of FIG. 2.
Figure 4:
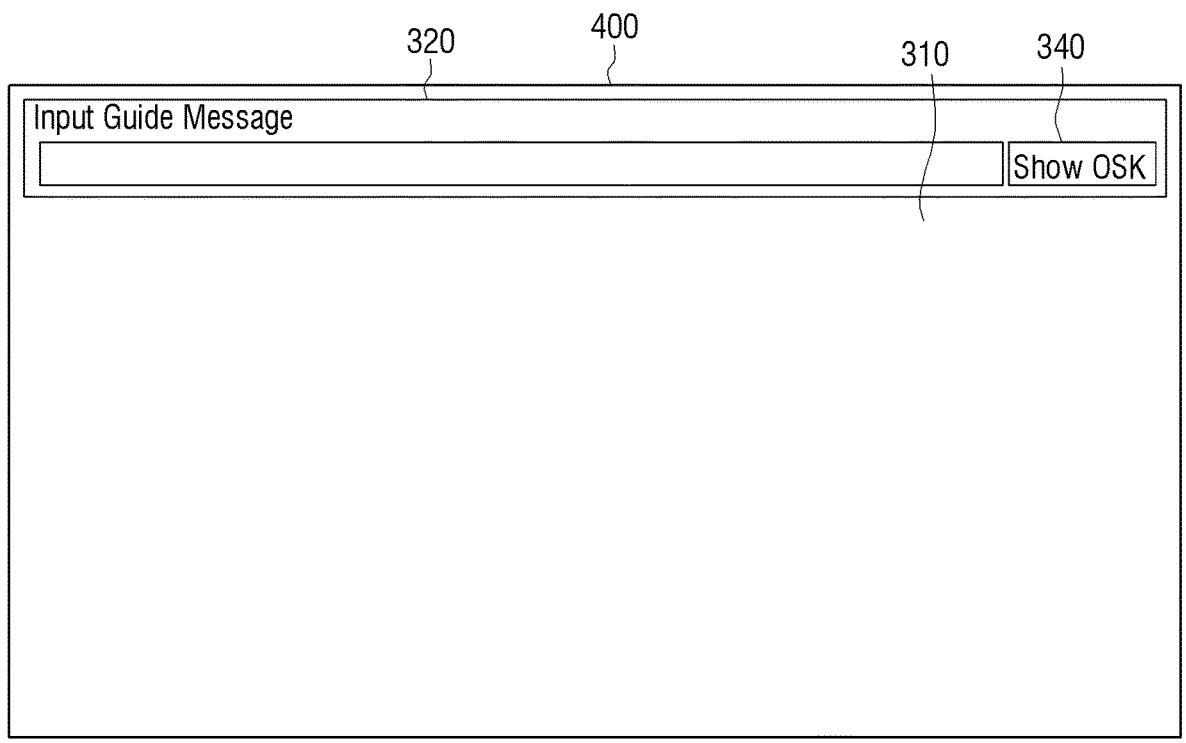

FIGS. 3 and 4 are views for showing examples of user interface windows that can be displayed on the display of FIG. 2. In detail, FIG. 3 is a view of an example of a user interface window that may be displayed when a control instruction is input from a control device which does not include letter keys for inputting letters, and FIG. 4 is a view of an example of a user interface window that may be displayed when a control instruction is input from a control device which includes letter keys for inputting letters.

Referring to FIG. 3, the user interface window 300 comprises a first region 320 and a second region 330 and is displayed on an image region 310. The image region 310 displays an image which was being displayed before the user interface window 300 is displayed, or displays a search result received via the first region 320.

The first region 320 displays letters corresponding to the control instruction received via the control device 20 i.e. letters selected by a user on the on-screen keypad.

The second region 330 displays an on-screen keypad for inputting letters. The on-screen keypad may have a QWERTY keyboard form. When a user selects a language other than English, the on-screen keypad may display other keypad formats such as Korean keyboard type 2, Korean keyboard type 3, etc. A user may input the letters by moving a curser in the left/right or up/down direction on the on-screen keypad of the second region. For example, if a cursor is located at "v" and the letter to be input is "a", a user may select "a" by clicking the left button of the control device three times, the up button once and the input button (or confirm/enter button). When "a" is input using the above process, the first region 320 may display the input letter "a."

The first user interface window 300 comprises an on-screen keypad, and thus a user can easily input letters using a control device, which does not include letter keys for inputting letters.

Referring to FIG. 4, a user interface window 400 comprises a first region 320 and a third region 340 and is displayed on an image region 310. The image region 310 displays an image which was being displayed before the user interface window 400 is displayed, or displays a search result received via the first region 320.

The first region 320 displays letters corresponding to the control instruction received via the control device 20, i.e., letters corresponding to the key input received via the control device 20.

The third region 340 receives a selection from the user as to whether an on-screen keypad should be displayed. When the third region 340 is selected, the first user interface window is displayed as in FIG. 3 even though the control device includes letter keys for inputting letters. In other words, the third region 340 manually receives from a user, a selection as to whether an on-screen keypad should be displayed.

As above, the second user interface window 400 does not include an on-screen keypad, and thus it is possible to prevent covering the screen with an on-screen keypad when a control device, including letter keys for inputting letters, is being used.

When it is necessary to display a user interface window for receiving letter input, an operation for displaying a first user interface window or a second user interface window has been explained above.

Hereinafter, a change of the user interface window depending on the state of the control device, after a first user interface window or a second user interface window is displayed, will be explained with reference to FIGS. 5-7.

Figure 5:
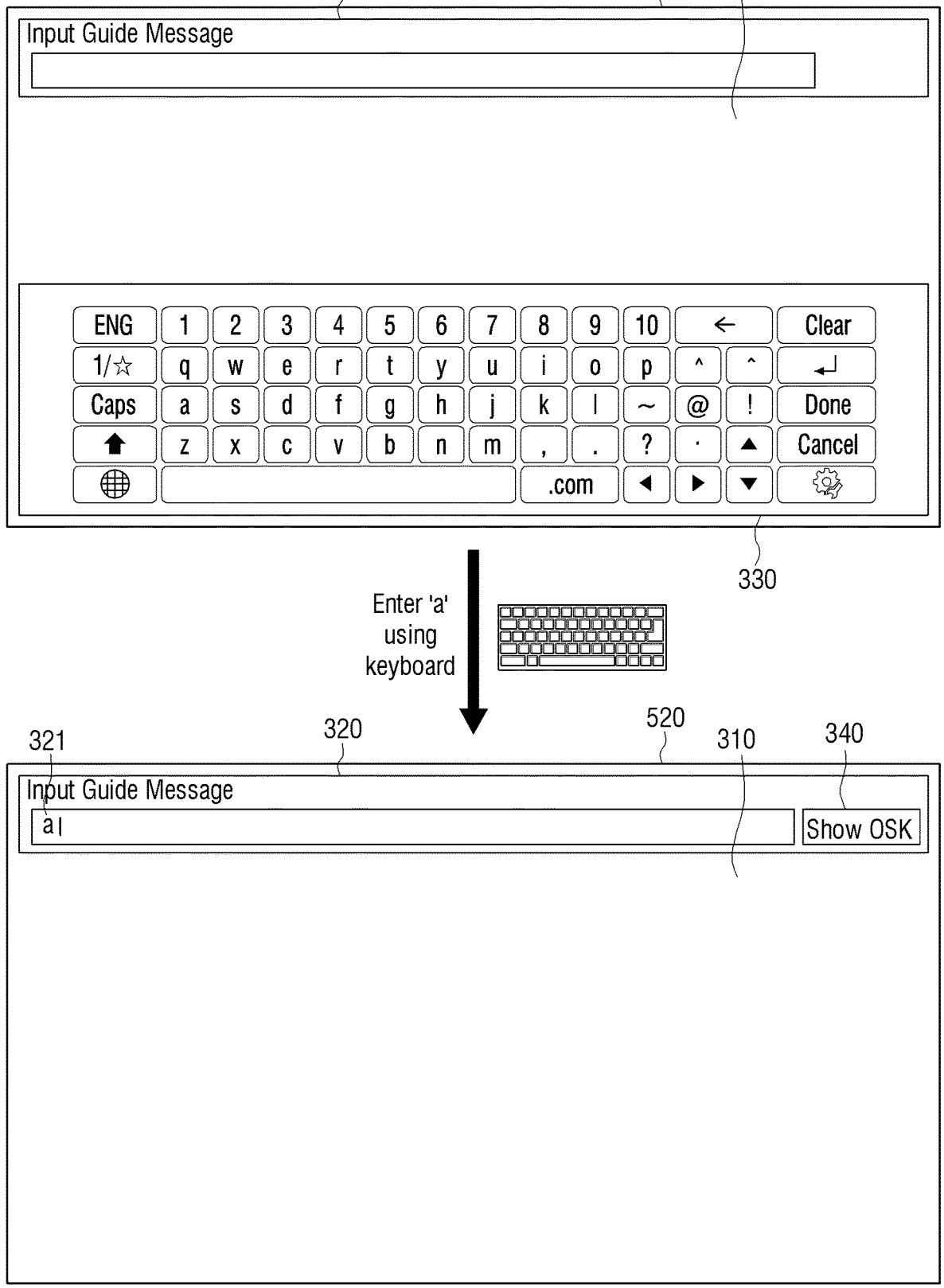

FIG. 5 is a view for explaining an operation of a display apparatus in the case of inputting a letter key with a second control device, which includes letter keys for inputting letters, in the middle of inputting letters with a first control device, which does not include letter keys for inputting letters.

Referring to FIG. 5, when a control instruction requiring a display of "a user interface window for inputting letters" is received from a control device, which does not include letter keys for inputting letters, a user interface window 510 including an on-screen keypad is displayed.

Thereafter, when a user inputs letters with a remote controller, a user may recognize the difficulty in inputting letters and may switch to a Bluetooth keyboard or another device which includes letter keys for inputting letters.

As such, upon receipt of a letter input from a control device, which includes letter keys for inputting letters when the first user interface window 510 is displayed, the display apparatus 100 switches from displaying the first user interface window 510 to displaying a second user interface window 520 that does not include an on-screen keypad. The first region 320 of the second user interface window 520 displays a letter input 321 received from the control device.

FIG. 6 is a view for explaining an operation of a display apparatus in the case of disconnecting from the control device, which includes letter keys for inputting letters, in the middle of inputting letters.

Referring to FIG. 6, when a letter input is received from a control device, which includes letter keys for inputting letters, a second user interface window 610, which does not include an on-screen keypad, is displayed.

Thereafter, when the display apparatus is disconnected from the control device, the display apparatus 100 displays a first user interface window 620, which includes an on-screen keypad. The first region 320 of the first user interface window 620 displays the same letters as those being displayed on the first region 320 of the second user interface window 610.

FIG. 7 is a view for explaining an operation of a display apparatus in the case of inputting a letter key with a second control device, which does not include letter keys for inputting letters, in the middle of inputting letters with a first control device, which includes letter keys for inputting letters.

Referring to FIG. 7, when a letter input is received from a control device, which includes letter keys for inputting letters, a second user interface window 710, which does not include an on-screen keypad, is displayed.

Thereafter, when an instruction for accessing a keypad (left/right or up/down button) is received from a control device, which does not include letter keys for inputting letters, or a third region 340 is selected, the display apparatus 100 displays a first user interface window 720, which includes an on-screen keypad. The first region 320 of the first user interface window 720 displays the same letters as those being displayed on the first region 320 of the second user interface window 710.

Figure 8:
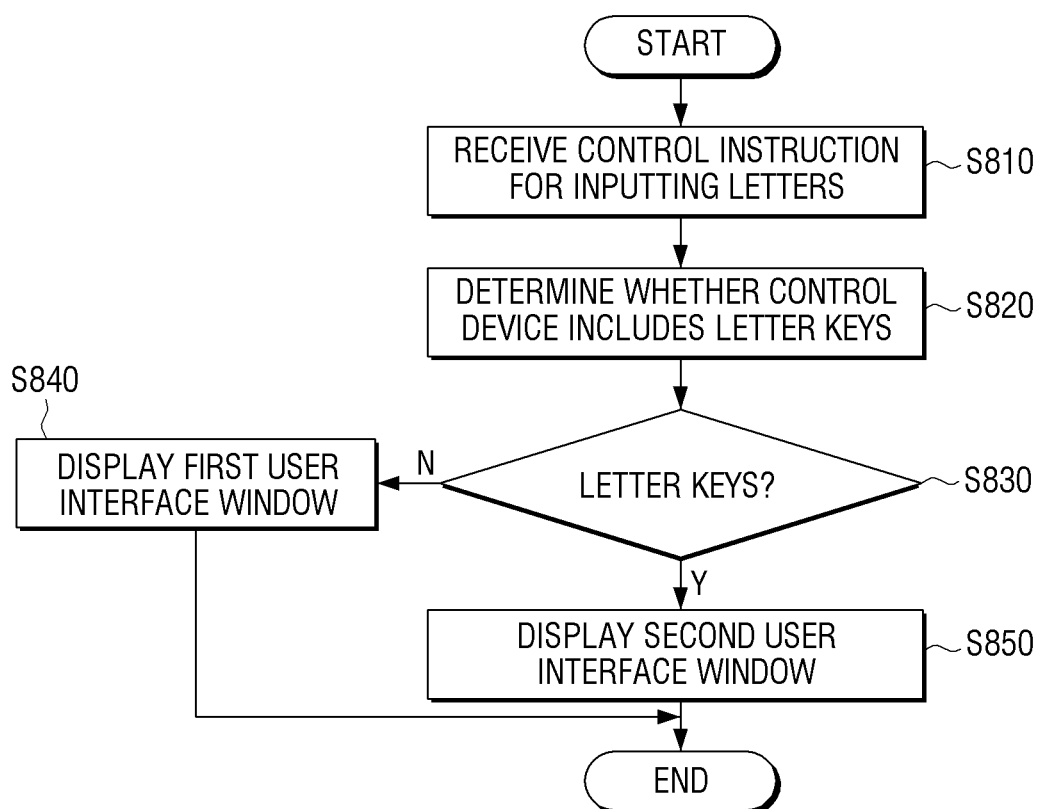
FIG. 8 is a flowchart of a method of displaying UI of a display apparatus according to an exemplary embodiment.

FIG. 8 is a flowchart of a method of displaying UI of a display apparatus according to an exemplary embodiment.

Referring to FIG. 8, the display apparatus receives a control instruction for inputting letters from a control device (S810).

Upon receipt of the control instruction, the display apparatus determines whether the control device includes letter keys for inputting letters (S820). In detail, the display apparatus may determine whether the control device currently inputting the control instruction includes letter keys for inputting letters, such as a QWERTY keyboard, based on information about the control device received together with the control instruction and/or the pre stored information about the control device. In the current embodiment, only the QWERTY keyboard is exemplified for inputting letters, but keyboards with other layouts such as Korean keyboard type 2, Korean keyboard type 3, Dvorak keyboard etc. may be used.

The above determination may be carried out when it is necessary to display a user interface window for receiving letter input, when a control instruction for inputting letters is input, or in real time (per a predetermined time period).

An on-screen keypad for inputting letters is selectively displayed depending on whether the control device includes letter keys for inputting letters. In detail, if the control device does not include letter keys for inputting letters (S830—N), a user interface window including a first region and a second region may be displayed, wherein the first region displays letters corresponding to the control instruction and the second region displays an on-screen keypad for inputting letters (S840).

When the control device includes letter keys for inputting letters (S830—Y), a user interface window, without including a second region but including a third region which allows users to select whether an on-screen keypad should be displayed, may be displayed, wherein the second region displays an on-screen keypad for inputting letters (S850).

As explained above, the method of displaying UI, according to an exemplary embodiment, selectively displays an on-screen keypad depending on whether the control device includes letter keys for inputting letters, and thus, when a control device without letter keys for inputting letters is used, letters can be easily input using the on-screen keypad, and when a control device including letter keys for inputting letters is used, it is possible to prevent the inconvenience of covering the screen with an on-screen keypad. The method of displaying UI in FIG. 8 may be implemented in the display apparatus having the configuration of FIG. 2 or may be implemented in display apparatuses with other configurations.

The aforementioned method of displaying UI may be implemented as a program including an algorithm executable in a computer, and the program may be provided by being stored in a non-transitory computer readable medium.

A non-transitory computer readable medium means a medium which stores data semi-permanently and can be read by a device, not a medium which stores data for a short time, such as register, cache or memory. In detail, aforementioned various applications or programs may be provided by being stored in a non-transitory computer readable medium such as CDs, DVDs, hard disks, blue ray disks, USBs, memory cards and ROMs.

Although a few exemplary embodiments have been shown and described, it will be appreciated by those skilled in the art that changes may be made in these embodiments without departing from the principles and spirit of the general inventive concept, the scope of which is defined in the appended claims and their equivalents.

What is claimed is:

1. A display device comprising:
 a communicator configured to communicate with an external device;
 a display; and
 at least one processor configured to:
  based on a user command for inputting letters being received, control the display to display a text input user interface (UI) and a first keypad UI including a plurality of letter UI items corresponding to a plurality of letters,
  receive status information indicating whether a second keypad UI is displayed on a display of the external device from the external device via the communicator while the first keypad UI is displayed on the display of the display device,
  based on the status information indicating that the second keypad UI is displayed on the display of the external device, and being received while the first keypad UI is displayed on the display of the display device, control the display of the display device not to display the first keypad UI while displaying the text input UI, and
  based on the status information indicating that the second keypad UI is not displayed on the display of the external device, and being received while the first keypad UI is not displayed on the display of the display device, control the display of the display device to display the first keypad UI together with the text input UI.

2. The display device of claim 1, wherein the at least one processor is further configured to, based on a user command for displaying the first keypad UI on the display of the display device being received while the first keypad UI is not displayed on the display of the display device, control the display of the display device to display the first keypad UI together with the text input UI.

3. The display device of claim 1, wherein the at least one processor is further configured to:
 control the display of the display device to display a cursor according to a user manipulation of a remote controller of the display device, and
 based on a letter UI item from among the plurality of letter UI items of the first keypad UI being selected via the cursor according to the user manipulation of the remote controller of the display device while the first keypad UI is displayed on the display of the display device, control the display of the display device to display a first letter corresponding to the selected letter UI item on the text input UI.

4. The display device of claim 3, wherein the at least one processor is further configured to, based on letter information being received from the external device via the communicator while the first keypad UI is not displayed on the display of the display device, control the display of the display device to display a second letter corresponding to the letter information on the text input UI.

5. The display device of claim 3, wherein the user manipulation of the remote controller is a user manipulation for selecting a letter key based on a four directional key included in the remote controller.

6. The display device of claim 3, wherein the remote controller of the display device does not comprise a keyboard for inputting a letter.

7. The display device of claim 1, wherein the external device comprises a keyboard UI including letter keys for inputting letters.

8. The display device of claim 1, wherein the external device is a smartphone.

9. A method for controlling a display device, the method comprising:
- based on a user command for inputting letters being received, displaying a text input user interface (UI) and a first keypad UI including a plurality of letter UI items corresponding to a plurality of letters,
- receiving status information indicating whether a second keypad UI is displayed on a display of an external device from the external device while the first keypad UI is displayed on the display of the display device,
- based on the status information indicating that the second keypad UI is displayed on the display of the external device, and being received while the first keypad UI is displayed on the display device, not displaying the first keypad UI while displaying the text input UI, and
- based on the status information indicating that the second keypad UI is not displayed on the display of the external device, and being received while the first keypad UI is not displayed on the display device, displaying the first keypad UI together with the text input UI.

10. The method of claim 9, further comprising:
- based on a user command for displaying the first keypad UI on the display of the display device being received while the first keypad UI is not displayed on the display device, displaying the first keypad UT together with the text input UI.

11. The method of claim 9, further comprising:
- displaying a cursor according to a user manipulation of a remote controller of the display device, and
- based on a letter UI item from among the plurality of letter UI items of the first keypad UI being selected via the cursor according to the user manipulation of the remote controller of the display device while the first keypad UI is not displayed on the display device, displaying a first letter corresponding to the selected letter UI item on the text input UI.

12. The method of claim 11, further comprising:
- based on letter information being received from the external device while the first keypad UI is not displayed on the display device, displaying a second letter corresponding to the letter information on the text input UI.

13. The method of claim 11, wherein the user manipulation of the remote controller is a user manipulation for selecting a letter key based on a four directional key included in the remote controller.

14. The method of claim 11, wherein the remote controller of the display device does not comprise a keyboard for inputting a letter.

15. The method of claim 9, wherein the external device comprises a keyboard UI including letter keys for inputting letters.

16. The method of claim 9, wherein the external device is a smartphone.

* * * * *